Patented Dec. 16, 1941

2,266,265

UNITED STATES PATENT OFFICE 2,266,265

MANUFACTURE OF RESINOUS CONDENSATION PRODUCTS FROM AMIDE-LIKE COMPOUNDS AND PURIFIED LIGNIN-SULPHONIC ACIDS

Alfred Rieche, Wolfen, Walter Rudolph, Bitterfeld, and Richard Klar, Wolfen, Germany, assignors to I. G. Farbenindustrie Aktiengesellschaft, Frankfort-on-the-Main, Germany No Drawing. Application February 8, 1939, Serial No. 255,216. In Germany February 19, 1938

7 Claims. (Cl. 260—70)

The present invention relates to the manufacture of resin-like condensation products which may be used for moulding purposes, as cation-exchangers, sticking agents, etc. Amide-like compounds, capable of forming with an aldehyde hydroxalkylated amides are condensed with an aldehyde and lignin-sulphonic acid or as a salt thereof. As amide-like compounds there are to be understood those having the general formula

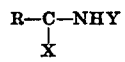

wherein R represents any radical, X means O, S or NH, and Y stands for H, alkyl or aryl. There may, for instance, be mentioned: urea, thio-urea, biuret, urethane, guanidine, melamine and cyanuric acid. As aldehyde there may be used above all formaldehyde and its homologues as well as furfurol.

The lignin-sulphonic acid and its salts are used in a purified form. It is obtained from sulphite cellulose waste liquor, for instance, by way of the difficultly soluble basic calcium salt of lignin-sulphonic acid (see U. S. Patent 2,077,884). For this purpose the sulphite cellulose waste liquors of various woods, for instance, pine or beech, may be used. There may be produced watersoluble and waterinsoluble condensation products. When using the free lignin-sulphonic acid the condensation may be carried out in such a manner that, for instance, urea is dissolved in formaline and the solution is then stirred together with lignin-sulphonic acid, condensation occuring immediately and may be assisted by heating. Waterinsoluble products are thus at once obtained.

The lignin-sulphonic acid may also be dissolved in alcohol and a solution of urea in formaline may be added in which case a water-insoluble resin separates already at ordinary temperature in the course of some hours.

But also a salt of the lignin-sulphonic acid, for instance, the sodium, potassium or calcium salt, may be mixed with urea and poly-hydroxymethylene and the whole may be heated for several hours at 70° C. to 80° C. in which case a condensation product is obtained which is still liquid at this temperature, but becomes more and more viscous and represents still a water-soluble pre-condensation product. The condensation to a water-insoluble product may be performed in an aqueous mineral acid solution.

The water-insoluble resins formed during the condensation in the aqueous solution are very porous and as long as they contain still water they have good thermoplastic properties. Therefore, shaped articles may easily be manufactured therefrom. After drying they are very porous masses which may advantageously be used for absorption purposes. The resins contain sulphonic acid groups and are very suitable for the exchange of cations, for instance, for removing from water the salts or the hardness.

By melting the components a pre-condensation product is obtained which together with suitable loading materials and softening agents may be pressed to shaped articles.

The water-soluble condensation products, especially those which are produced in the presence of an alcohol, e. g. methyl or ethyl alcohol, are excellent sticking agents.

The following examples illustrate the invention, the parts being by weight:

*Example 1.*—100 parts of purified lignin-sulphonic acid (sirup of 50 per cent strength) are stirred, while cold, with a solution of 40 parts of urea in 85 parts of formaline of 32 per cent strength. The thinly liquid homogeneous mixture is spontaneously heated and solidifies entirely after a short time to a hard mass, which after drying is very porous. The mass may be freed from the residues of unchanged lignin-sulphonic acid by washing it with water.

*Example 2.*—Before the condensation begins, 20 parts of alcohol are added to the mixture prepared as described in Example 1. The condensation occurs more slowly, but also with evolution of heat and solidification. The condensation product melts in the water-bath, may easily be moulded and still warm it may be brought into a form suitable for absorption purposes. The products may be freed from still adhering unchanged lignin-sulphonic acid by watering them.

*Example 3.*—100 parts of purified lignin-sulphonic acid (sirup of 50 per cent strength) are dissolved in 200 parts of methanol and then a solution of 40 parts of urea in 85 parts of formaline of 32 per cent strength is added. At room temperature there is formed in the course of 12 hours a voluminous precipitate which may easily be filtered and which after filtration with suction, washing out with water and drying forms an voluminous powder having a yellowish light grey colouration. The yield amounts to 40 to 50 parts. The suspension of the product in water shows a neutral reaction. By adding sodium chloride, magnesium chloride or calcium chloride a strongly acid reaction occurs on account of the exchange of cations. This process is reversible,

*Example 4.*—100 parts of purified sodium ligninsulphonate (neutral) are well mixed with 100 parts of polyhydroxymethylene and 100 parts of urea and the mixture is heated to 70° C. The mass melts and forms a dark sirup which is at first thinly liquid but becomes more and more viscous. After 3 hours it is allowed to cool and the brittle mass which is still water-soluble and thus represents a pre-condensation product is pulverized. By further acid condensation it may be transformed into a product which is similar to that obtained according to Example 3, but it may also be rendered water-insoluble by applying pressure and heat treatment.

*Example 5.*—100 parts of a purified neutral sodium salt of lignin-sulphonic acid are dissolved in 100 parts of water and 100 parts of para formaldehyde and 100 parts of urea are added. The mixture is heated for 11 hours to 70° C., while stirring. 600 parts of water are added and the neutral solution is acidified towards Congo-red with hydrochloric acid, the quantity of which being at least equivalent to the sodium. The insoluble condensation product is filtered off and the filtrate is evaporated to dryness. There are obtained 80 parts of a brown powder, from which the sodium chloride can be extracted by water. The resulting jelly is dried in vacuo, yielding a product which is soluble after swelling in hot water.

*Example 6.*—100 parts of the neutral sodium salt of purified lignin-sulphonic acid, 60 parts of water, 50 parts of urea and 30 parts of para-formaldehyde are heated to 70° C. for 2½ hours while stirring. 60 parts of methyl or ethyl alcohol are added and the solution is acidified with about 60 parts of concentrated hydrochloric acid. While spontaneously heating condensation takes place yielding a resinous glue, which may be used for sticking wood, paper etc. in the hot or cold way.

Instead of the sodium salt of lignin-sulphonic acid, there may be used the corresponding calcium salt.

The specific advantage of the invention depends on the use of the purified lignin-sulphonic acid material. For condensation products on the base of sulphite cellulose waste liquor as hitherto known are useless for the most purposes on account of their content of sugar, decomposition products of cellulose and lignin etc. which partly also react with aldehydes.

The invention is of course not limited to the specific details described, for obvious modifications may occur to a person skilled in the art.

What we claim is:

1. The process which comprises condensing a member of the group consisting of an urea, a thio-urea, an urethane, biuret, a guanidine, melamine, cyanuric acid and a member of the group consisting of lignin-sulphonic acid, its alkali metal and alkaline earth metal salts purified by way of the basic calcium salt of lignin-sulphonic acid with an aldehyde selected from the class consisting of formaldehyde and furfural.

2. The process which comprises condensing a member of the group consisting of an urea, a thio-urea, an urethane, biuret, a guanidine, melamine, cyanuric acid and a member of the group consisting of lignin-sulphonic acid, its alkali metal and alkaline earth metal salts purified by way of the basic calcium salt of lignin-sulphonic acid with an aldehyde selected from the class consisting of formaldehyde and furfural, the reaction being carried out in the presence of water.

3. The process which comprises condensing a member of the group consisting of an urea, a thio-urea, an urethane, biuret, a guanidine, melamine, cyanuric acid and a member of the group consisting of lignin-sulphonic acid, its alkali metal and alkaline earth metal salts purified by way of the basic calcium salt of lignin-sulphonic acid with an aldehyde selected from the class consisting of formaldehyde and furfural, the reaction being carried out in the presence of an aliphatic alcohol.

4. The process which comprises condensing urea, purified lignin-sulphonic acid and formaldehyde in the presence of water.

5. The process which comprises condensing urea, a purified sodium salt of lignin-sulphonic acid and formaldehyde in the presence of an aliphatic alcohol.

6. The process which comprises condensing 100 parts of a purified sodium salt of lignin-sulphonic acid, dissolved in 60 parts of water, with 50 parts of urea and 30 parts of para-formaldehyde by heating to about 70° C. for 2½ hours, adding 60 parts of ethyl alcohol and acidifying with about 60 parts of concentrated hydrochloric acid.

7. Resin-like condensation products substantially identical with those obtained according to claim 1.

ALFRED RIECHE.
WALTER RUDOLPH.
RICHARD KLAR.